United States Patent
Hoeller et al.

(10) Patent No.: US 10,401,145 B2
(45) Date of Patent: Sep. 3, 2019

(54) METHOD FOR CALIBRATING AN OPTICAL ARRANGEMENT

(71) Applicant: CARL ZEISS INDUSTRIELLE MESSTECHNIK GMBH, Oberkochen (DE)

(72) Inventors: Frank Hoeller, Aalen (DE); Oliver Paul, Langenau (DE); Frank Widulle, Neu-Ulm (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 2 days.

(21) Appl. No.: 15/613,599

(22) Filed: Jun. 5, 2017

(65) Prior Publication Data
US 2017/0356736 A1    Dec. 14, 2017

(30) Foreign Application Priority Data
Jun. 13, 2016   (DE) .................. 10 2016 110 802

(51) Int. Cl.
*G01B 11/00*     (2006.01)
*G01B 11/25*     (2006.01)
(Continued)

(52) U.S. Cl.
CPC ........ *G01B 11/005* (2013.01); *G01B 11/2504* (2013.01); *G01B 21/042* (2013.01); *H04N 7/18* (2013.01)

(58) Field of Classification Search
CPC .... G01B 11/005; G01B 21/042; G01B 11/00; G01B 11/002; G01B 11/25;
(Continued)

(56) References Cited

U.S. PATENT DOCUMENTS 7,019,824 B2 * 3/2006 Wegmann ............... G03F 7/706
                                                    356/124
7,479,982 B2    1/2009 Otani et al.
(Continued)

FOREIGN PATENT DOCUMENTS

CN   101561251 A   10/2009
DE   195 36 297 A1   4/1997
(Continued)

OTHER PUBLICATIONS

Xiaobo Chen et al.; Accurate calibration for a camera-projector measurement system based on structured light projection; Dec. 2007; 36 pp.
(Continued)

*Primary Examiner* — James R Sheleheda
(74) *Attorney, Agent, or Firm* — Harness, Dickey & Pierce, P.L.C.

(57) ABSTRACT

A method for calibrating an optical arrangement for determining dimensional properties of a measurement object and a coordinate measuring machine implementing the method are disclosed. The optical arrangement has a camera and a projector for projecting a first periodic pattern onto a projection area. The optical arrangement is moveable relative to a workpiece table along a first axis. A matte surface is arranged on the workpiece table at a first position relative to the optical arrangement. A second periodic pattern, which is separate from the first periodic pattern, is provided and shifted on the matte surface. Images of the second pattern are recorded using the camera and at least one distortion aberration of the camera is determined using the second periodic pattern. The first periodic pattern is projected onto the matte surface and first and second coordinates of at least one pattern point of the projected first periodic pattern are determined, the second coordinate with respect to a second axis, which is perpendicular to the first axis. The matte
(Continued)

surface is displaced relative to the optical arrangement to a second position along the first axis and the aforementioned steps are repeated for a plurality of relative positions of the matte surface along the first axis.

19 Claims, 4 Drawing Sheets

(51) Int. Cl.
*G01B 21/04* (2006.01)
*H04N 7/18* (2006.01)

(58) Field of Classification Search
CPC ............ G01B 11/2504; G01B 11/2513; G01B 21/00; G01B 21/02; G01B 21/04; G01B 21/045; H04N 7/18
See application file for complete search history.

(56) References Cited

U.S. PATENT DOCUMENTS

| | | | | |
|---|---|---|---|---|
| 9,036,900 B2* | 5/2015 | Sato | ................ | G01B 11/25 382/154 |
| 9,661,304 B2* | 5/2017 | Calakli | ................ | H04N 13/254 |
| 2001/0033386 A1* | 10/2001 | Kranz | ................ | G01B 11/2518 356/601 |
| 2005/0280831 A1* | 12/2005 | Fujiwara | ........... | G01B 11/2536 356/603 |
| 2006/0001861 A1* | 1/2006 | Wegmann | ............... | G03F 7/706 356/124 |
| 2007/0085849 A1 | 4/2007 | Kosolapov | | |
| 2007/0106482 A1* | 5/2007 | Zandifar | ............. | G09G 3/2092 702/85 |
| 2008/0180693 A1* | 7/2008 | Dillon | ................ | G01B 11/2441 356/521 |
| 2009/0141287 A1* | 6/2009 | Sato | ................... | G01B 11/2536 356/610 |
| 2009/0224777 A1* | 9/2009 | Kim | ..................... | G02F 1/1309 324/760.01 |
| 2010/0135534 A1* | 6/2010 | Weston | ................ | G01B 11/007 382/106 |
| 2010/0299103 A1* | 11/2010 | Yoshikawa | ............ | G01B 11/25 702/167 |
| 2011/0058023 A1* | 3/2011 | Boles | ................. | G01B 11/2513 348/46 |
| 2011/0134408 A1* | 6/2011 | Kuramoto | .......... | G01M 11/0264 355/67 |
| 2012/0154272 A1 | 6/2012 | Hildreth | | |
| 2014/0118496 A1* | 5/2014 | Calakli | ................ | H04N 13/254 348/46 |
| 2014/0333946 A1 | 11/2014 | Nakamura | | |
| 2015/0015701 A1* | 1/2015 | Yu | ........................ | H04N 5/2259 348/136 |
| 2015/0192406 A9* | 7/2015 | Bridges | ................ | G01S 17/003 348/46 |
| 2015/0219441 A1* | 8/2015 | Haitjema | ........... | G01B 11/0608 356/630 |
| 2015/0254819 A1* | 9/2015 | Hara | ...................... | G06T 5/006 345/647 |
| 2015/0260509 A1* | 9/2015 | Kofman | ............. | G01B 11/2504 356/601 |
| 2016/0048969 A1* | 2/2016 | Zhao | .................. | H04N 5/37206 348/136 |
| 2016/0080726 A1* | 3/2016 | Rangarajan | ............... | G06T 5/50 348/46 |
| 2017/0039756 A1* | 2/2017 | Moule | .................... | G01B 11/25 |
| 2017/0054965 A1* | 2/2017 | Raab | ....................... | G01C 11/02 |
| 2017/0094251 A1* | 3/2017 | Wolke | .................. | H04N 13/246 |
| 2017/0102224 A1* | 4/2017 | Bridges | ................ | G01B 21/047 |
| 2017/0289416 A1* | 10/2017 | Umemura | ............ | G01B 11/002 |
| 2017/0356736 A1* | 12/2017 | Hoeller | ................ | G01B 11/005 |

FOREIGN PATENT DOCUMENTS

| | | |
|---|---|---|
| DE | 60317976 T2 | 12/2008 |
| DE | 102014102634 A1 | 8/2015 |
| DE | 102014104903 A1 | 10/2015 |
| EP | 2 803 492 A1 | 11/2014 |

OTHER PUBLICATIONS

Christoph Schmalz et al.; Optical Engineering—Camera calibration: active versus passive targets; Nov. 2011; 11 pp.

Hongyu Liu et al.; Calibration-based phase-shifting projected fringe profilometry for accurate absolute 3D surface profile measurement; 16 pp.

Chinese Search Report (English language translation included) for Appl'n. No. 201710440519.5; 6 pp.

* cited by examiner

METHOD FOR CALIBRATING AN OPTICAL ARRANGEMENT

CROSS-REFERENCES TO RELATED APPLICATIONS

This application claims Paris Convention priority from German patent application 10 2016 110 802.2 filed on Jun. 13, 2016 with the German Patent and Trademark Office. The entire content of this priority application is incorporated herein by reference.

BACKGROUND OF THE INVENTION

The invention relates to a method for calibrating an optical arrangement comprising a camera and a projector. The invention further relates to a coordinate measuring machine having such an optical arrangement and implementing the calibration method.

A method of the afore-mentioned type is disclosed by DE 195 36 297 A1. A projector is used to project a predetermined pattern onto a projection area which, for example, is on a calibration plate. The projection area or the calibration plate is introduced into the measurement volume in advance. Then, a coordinate with respect to a first axis in the coordinate system of the measurement volume is determined for a pattern point in the projected pattern, said first axis preferably being perpendicular to the projection area (e.g. z-axis). The optical arrangement may be calibrated with respect to the first (z-)axis on the basis of the determined first coordinate.

Further methods known from the prior art use plane plates with markers which have been applied in a highly precise manner. However, such plane plates are expensive. Moreover, a whole-area distortion measurement is not possible with such an arrangement, and so the accuracy of the calibration is limited.

Another disadvantage afflicting the aforementioned known methods is that these require a plurality of calibration steps with different components, the spatial assignment of which is only possible with much effort.

SUMMARY OF THE INVENTION

It is therefore an object of the present invention to provide a method for calibrating an optical arrangement of the type mentioned at the outset, which can easily be implemented.

It is another object of the invention to provide a method for calibrating an optical arrangement that can be implemented cheaper and with less effort.

It is yet another object of the invention to provide a coordinate measuring machine having an optical arrangement comprising a camera and a projector, which can conveniently be calibrated with high accuracy.

According to a first aspect of the invention, there is provided a method for calibrating an optical arrangement for determining dimensional properties of a measurement object, the optical arrangement comprising a projector configured for projecting a first periodic pattern onto a projection area within a measurement volume and a camera for recording images of the projection area, the method comprising the steps of:

a) arranging a matte surface in the measurement volume at a first position relative to the optical arrangement along a first axis, b) providing a second periodic pattern, which is separate from the first periodic pattern, on the matte surface and shifting the second periodic pattern in a plurality of phase steps in at least one second direction which is perpendicular to the first axis, the at least one second direction defining at least one second axis, c) recording images of the second pattern using the camera and determining at least one distortion aberration of the camera using the second periodic pattern, d) projecting the first periodic pattern onto the matte surface by means of the projector, e) recording images of the first pattern using the camera and determining a first coordinate of at least one pattern point of the projected first periodic pattern, the first coordinate is with respect to the first axis, f) determining a second coordinate of the at least one pattern point of the projected first periodic pattern, the second coordinate is with respect to the second axis, and g) displacing the matte surface relative to the optical arrangement to a second position along the first axis and repeating steps b) to f) for a plurality of relative positions of the matte surface along the first axis.

According to another aspect of the invention, in a coordinate measuring machine comprising a workpiece table configured for receiving a measurement object, comprising a working head moveable relative to the workpiece table along a first axis, the first axis being perpendicular to the workpiece table, and comprising an evaluation and control unit configured for determining spatial coordinates on the measurement object using the working head and the workpiece table, with the working head comprising an optical arrangement having a camera and a projector, and with the projector being configured for projecting a first periodic pattern onto a projection area on the workpiece table, there is provided a method for calibrating the optical arrangement comprising the steps of:

a) arranging a matte surface on the workpiece table while the optical arrangement is at a first position relative to the workpiece table along the first axis, b) providing a second periodic pattern, which is separate from the first periodic pattern, on the matte surface and shifting the second periodic pattern in a plurality of phase steps in at least one second direction which is perpendicular to the first axis, the at least one second direction defining at least one second axis, c) recording images of the second pattern using the camera and determining at least one distortion aberration of the camera using the second periodic pattern, d) projecting the first periodic pattern onto the matte surface by means of the projector, e) recording images of the first pattern using the camera and determining a first coordinate of at least one pattern point of the projected first periodic pattern using the evaluation and control unit, the first coordinate is with respect to the first axis, f) determining a second coordinate of the at least one pattern point of the projected first periodic pattern using the evaluation and control unit, the second coordinate is with respect to the second axis, and g) displacing the matte surface relative to the optical arrangement to a second relative position along the first axis and repeating steps b) to f) for a plurality of relative positions of the matte surface along the first axis.

According to another aspect of the invention, there is provided a coordinate measuring machine for determining dimensional properties of a measurement object, comprising a workpiece table, comprising an optical arrangement moveable relative to the workpiece table, the optical arrangement comprising a projector configured for projecting a first periodic pattern onto a projection area within a measurement volume, and comprising a camera configured for recording images of the projection area, comprising an evaluation and control unit configured for determining spatial coordinates on the measurement object using the first periodic pattern and the camera, and comprising a calibration device for calibrating the optical arrangement, wherein the calibration device comprises a matte surface configured for being arranged on the workpiece table at a first position relative to the optical arrangement along a first axis, and wherein the evaluation and control unit is further configured to execute the following steps:

i) providing a second periodic pattern, which is separate from the first periodic pattern, on the matte surface and shifting the second periodic pattern in a plurality of phase steps in at least one second direction which is perpendicular to the first axis, the at least one second direction defining at least one second axis, ii) recording images of the second pattern using the camera and determining at least one distortion aberration of the camera using the second periodic pattern, iii) projecting the first periodic pattern onto the matte surface by means of the projector, iv) recording images of the first pattern using the camera and determining a first coordinate of at least one pattern point of the projected first periodic pattern, the first coordinate is with respect to the first axis, v) determining a second coordinate of the at least one pattern point of the projected first periodic pattern, the second coordinate is with respect to the second axis, and vi) displacing the matte surface relative to the optical arrangement to a second relative position along the first axis and repeating steps i) to v) for a plurality of relative positions of the matte surface along the first axis.

The calibration of the optical arrangement with respect to the first axis, preferably the z-axis, in the coordinate system of the measurement volume of the optical arrangement is carried out on the basis of the first pattern, which is projected onto the projection area. The coordinate system of the measurement volume is preferably a coordinate system known as a global coordinate system. The calibration of the optical arrangement with respect to the second axis perpendicular to the first (z-)axis, preferably x- or y-axis, of the coordinate system of the measurement volume is carried out on the basis of the second pattern which is displayed on the display area in a manner detecta-ble by the camera. Hence, it is possible to establish a correlation between the coordinates, in particular the x- y- and z-coordinates, of each pattern point in the coordinate system of the measurement volume and the coordinates, in particular the x'-, y'- and z'-coordinates, of an image point corresponding to the pattern point, in the coordinate system of the detection plane of the camera. In this way, the optical arrangement is calibrated particularly accurately.

Since the second pattern differs from the projected pattern of the first pattern, the calibration with respect to the first axis may be decoupled, at least in part, from the calibration with respect to the second axis. Within the scope of this invention, "differs" is understood to mean that the projected pattern and the second pattern are two separate patterns. The projected pattern is produced by projecting the first pattern, while the second pattern is displayed directly on the display area without projection. Nevertheless, the second pattern may contain the same pattern form with the projected pattern and hence be embodied to have the same content as the projected pattern.

In addition to detecting the second pattern, the camera may also be configured to detect the projected pattern. To this end, the projection area is preferably configured as alignable toward the camera.

Thanks to the aforementioned decoupling, the method is advantageous in relation to the calibration methods known from the prior art, in which the first pattern is projected onto the projection area and the projected pattern arising in the process is used both for the calibration with respect to the first axis and for the calibration with respect to the second axis of the coordinate system of the measurement volume. Therefore, the accuracy of the calibration with respect to the two axes of the coordinate system of the measurement volume depends only on the quality of the projected pattern in the methods known from the prior art. This means increased demands in respect of accuracy are placed on the projected pattern or on the projector.

In contrast to the prior art, the calibration steps of the optical arrangement with respect to the first axis and the second axis of the coordinate system of the measurement volume may be carried out in a manner decoupled from one another, at least in part. This reduces the risk of an error in the projected pattern propagating to the calibration of the optical arrangement with respect to the second axis.

Moreover, it is possible to dispense with expensive plane plates with high precision markers which can only be applied with much outlay, and so the method is more cost-effective. Moreover, a whole-area distortion measurement may be carried out with the method, increasing the accuracy of the calibration. Finally, the method according to the invention only requires a small number of components, and so the spatial assignment is simplified, likewise having a cost-effective effect on the method according to the invention.

Therefore, the aforementioned object is completely achieved.

In a preferred configuration, the method further comprises providing the projection area by way of a matte surface, wherein the matte surface is formed on a display of an electronic device and/or a ground glass screen.

The matte surface serves as background for the projection of the first pattern, which has an advantageous effect on projecting the first pattern on account of the low reflectivity thereof. The electronic device may be a tablet, a smartphone, or a mobile computing device comprising a screen and it is therefore available in a simple manner. Advantageously, the method according to the invention is more cost-effective as a result thereof. The matte surface may be arranged on a cover glass of the display of the electronic device. In particular, the matte surface may be formed by etching, by applying a matte film onto the cover glass or by matting one side of the cover glass. The matte surface may be designed to be alignable toward the camera.

The matte surface may have a planarity error which is smaller than a planarity error of the optical arrangement. Hence, the projection area is advantageously sufficiently plane such that the calibration is particularly accurate. The cover glass may be designed to be switchable between a first state, in which the cover glass is transparent, and a second state, in which the cover glass is opaque, wherein the switching of the cover glass may be based on the use of an electrochromic layer or a liquid crystal. This reduces or avoids a loss of resolution in the active mode of the display, in which the latter is switched on for the calibration with respect to the second (x- and/or y-)axis. Further, the display area, in particular the display, preferably has a self-luminous design in order to simplify the display of the second pattern.

In a further preferred configuration, the method further comprises providing the matte surface on the display area and/or on a rear area lying opposite the display area.

If the matte surface lies on the display area, the projection area overlaps with the display area or both areas are arranged at the same level. This means that the first coordinate of the pattern point of the projected pattern determined during the calibration with respect to the first axis of the measurement volume may also be used for the calibration with respect to the second axis of the measurement volume, simplifying the calibration of the optical arrangement. In the case where the matte surface is arranged opposite the display area, the display area may be illuminated separately in order to simplify the detection of the second pattern by the camera. By way of example, the ground glass screen may be provided with the matte surface on a front side and with the applied second pattern, in particular a sinusoidal stripe pattern, on a rear side.

In a further preferred configuration, the method further comprises providing the display area on the display of the electronic device and/or on the ground glass screen.

In this configuration, the display or the ground glass disk may be used both for the calibration with respect to the first axis and with respect to the second axis of the measurement volume such that there is no need for an additional component for the calibration with respect to the first axis or second axis. Advantageously, the spatial assignment of the various components for carrying out the calibration method is simplified further. Advantageously, the display or the screen of the electronic device constitutes a display element such that the display area is provided by the display surface of the electronic device.

In the case where the matte surface is formed on a cover glass of the display, the matte surface may be arranged on a front side of the cover glass facing to the outside of the display, while the display area may be arranged on a rear side of the cover glass facing to the inside of the display. Hence, the projection area and the display area are separated from one another by the thickness of the cover glass.

The display may be switched off during the calibration with respect to the first axis, in which, preferably, use is made of the matte surface and not the display area or the display surface, and switched on during the calibration with respect to the second axis, in which, preferably, use is made of the display surface and not the matte surface, in order to display the second pattern. In this way, the display may be used (preferably simultaneously) as a passive element for the calibration with respect to the first axis, e.g. z-axis, in an illuminated state for projecting the first pattern, e.g. by means of the projector, and as an active element for the calibration with respect to the second axis, e.g. the x- and/or y-axis.

In a further preferred configuration, the first pattern and/or the second pattern comprises a periodic pattern, preferably periodic stripe pattern, more preferably a sinusoidal stripe pattern.

The phase properties may be used for the calibration with respect to the first and/or second axis by using a periodic pattern, a periodic stripe pattern or a sinusoidal stripe pattern, further increasing the accuracy of the calibration. In particular, with the aid of the stripe pattern, the calibration may be carried out with a high accuracy on the basis of the principles of the stripe projection, as known from Liu et al., Optics Communications 216 (2003) 65-80. Preferably, the optical arrangement comprises a stripe projection system to this end.

In a further preferred configuration, the method further comprises producing a phase shift in the periodic pattern of the first pattern and/or second pattern.

The phase shift may be used to determine a dependence of the first coordinate of the pattern point in the projected pattern on the phase in the periodic pattern, which has a particularly high accuracy and tolerance in relation to projection faults of the projector. Alternatively, or additionally, the first and/or second pattern may be pushed through in a plurality of phase steps.

In a further preferred configuration, the phase shift is brought about by a lateral movement of the display area.

This facilitates a simpler phase shift in relation to an electrically produced phase shift on a display surface. Moreover, this is particularly sparing for the display element (or the ground glass screen), on which the display area is arranged since heating of the display element, which is unavoidable if use is made of a display surface for an electronic display of the phase shift on account of impressing a current, is only insignificant or completely removed.

In a further preferred configuration, the method further comprises assigning coordinates of an image point of the camera image in a second coordinate system of the detection plane to a second coordinate of the pattern point of the second pattern corresponding to the image point of the camera image, wherein the second coordinate is related to the second axis of the first coordinate system.

In this way, the calibration with respect to the second axis in the coordinate system of the measurement volume is particularly effective. In particular, an accurate calibration may be obtained for each image point in the recorded camera image, preferably for each pixel of the detection plane of the camera, by the assignment of the coordinates.

In a further preferred configuration, the method further comprises assigning the coordinates of the image point of the camera image in the second coordinate system of the detection plane to a third coordinate of the pattern point of the second pattern corresponding to the image point of the camera image, wherein the third coordinate is related to a third axis of the first coordinate system which is perpendicular to the first axis and the second axis.

This facilitates the calibration with respect to all three spatial axes in the coordinate system of the measurement volume, and so a whole-area calibration of the optical arrangement is obtained.

In a further preferred configuration, determining the first coordinate of the pattern point in the projected pattern is based on a measurement of a position of the projection area, preferably by means of a stage.

In this way, the first coordinate of the pattern point in the projected pattern may be determined in a particularly simple manner. The stage or a table is preferably designed to displace the projection area, preferably the display of the electronic device and/or the ground glass screen which is fastened to the stage, along the first axis. Together with the optical arrangement, the stage may be connected to a controller in order to align the display in relation to the camera. More preferably, auxiliary markers may be used to align the display.

In a further preferred configuration, detecting and/or displaying the second pattern is carried out before determining the first coordinate of the pattern point in the projected pattern, more preferably before projecting the first pattern.

Hence, the calibration of the optical arrangement with respect to the second axis is carried out before the calibration with respect to the first axis, and so the calibration results from the first calibration (with respect to the second axis) may be taken into account during the second calibration (with respect to the first axis). The display of the electronic device may be switched off after the assignment of the coordinates of the image point of the camera image and before the projection of the first pattern, and so the method according to the invention is advantageously energy-efficient.

In a further preferred configuration, the method further comprises measuring at least one distortion aberration of the camera image.

By way of example, distortion aberrations arise by virtue of the display area, in particular the display surface of the electronic device, being inclined in relation to the optical axis of the camera, wherein this is referred to as a perspective distortion, in which straight stripes in the displayed (second) pattern, however, remain straight. Distortion aberrations lead to the curvature of the stripes displayed in the (second) pattern and should therefore be removed. This may be brought about by measuring the distortion aberrations, for example by means of a phase evaluation, preferably in combination with an active display. Hence, the image curvature caused by the distortion aberrations may be accurately evaluated for each individual image point, in particular for each individual pixel, in the camera image. The distortion measurement is preferably carried out before the assignment of the coordinates of the image points of the camera image in order to take possible distortion aberrations better into account during the calibration.

In a further preferred configuration, the first axis of the first coordinate system is aligned perpendicular to the projection surface and/or the display surface.

Hence, the second axis lies parallel to the projection area and/or to the display area, wherein the first coordinate system of the measurement volume is set by the projection area or by the display area. Alternatively, or additionally, the first axis may be aligned parallel to the optical axis of the camera.

In a further preferred configuration, the method further comprises ascertaining a phase belonging to the determined first coordinate of the pattern point in the projected pattern on the basis of the first pattern.

As a result of this, it is possible to obtain a phase dependence of the first coordinate determined during the calibration with respect to the first axis, in particular the z-axis, which increases the accuracy of the calibration.

In a further preferred configuration, the method comprises arranging the projection area in a first orientation in the measurement volume, wherein a calibration cycle comprising the calibration of the optical arrangement with respect to the first axis and the second axis of the coordinate system of the measurement volume is carried out in the case of the first orientation of the projection area and repeated at one or more second orientations of the projection area in the measurement volume, wherein the plurality of second orientations are selected in such a way to facilitate a plurality of first coordinates of the pattern point of the projected pattern in the first coordinate system, wherein the distance between adjacent first coordinates is preferably constant.

Hence, the calibration cycle may be carried out at different first coordinates. Preferably, the optical arrangement may be calibrated first with respect to the second (x- and/or y-) axis and, following this, with respect to the first (z-)axis during each calibration cycle for a corresponding orientation of the projection area or of the display/the ground glass screen, wherein the projection area or the display/the ground glass screen is displaced along the first (z-)axis after each calibration cycle by a predetermined, preferably constant, distance and the next calibration cycle is carried out in the new orientation.

Further advantages and features emerge from the following description and the attached drawing.

It is understood that the aforementioned features and those yet to be explained below may be used not only in the respectively specified combination but also in other combinations or on their own, without departing from the scope of the present invention.

BRIEF DESCRIPTION OF THE DRAWINGS

Exemplary embodiments of the invention are illustrated in the drawing and described hereinafter with reference thereto. In the drawing.

DETAILED DESCRIPTION OF THE PREFERRED EMBODIMENTS

Figure 1:
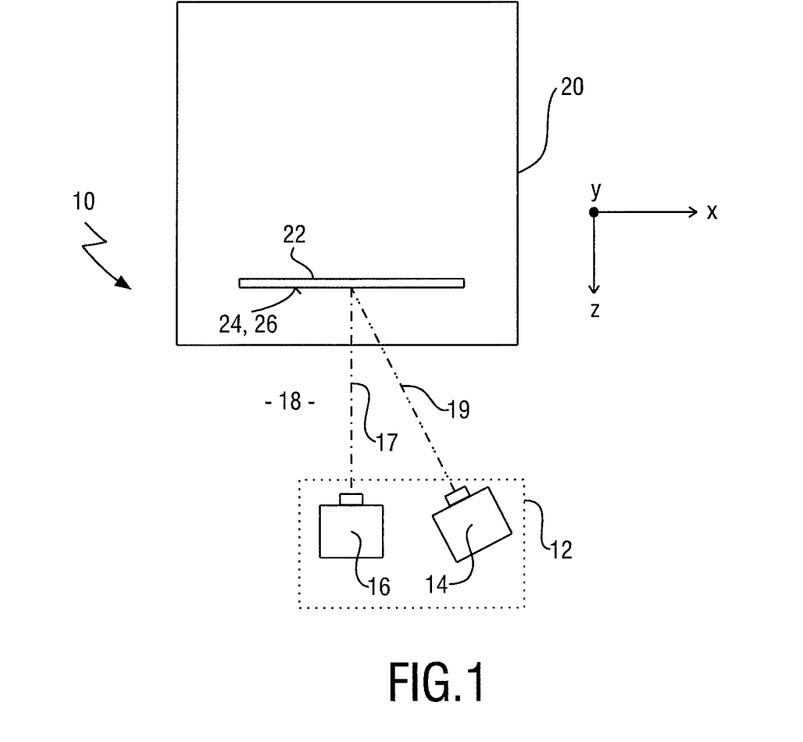
FIG. 1 shows a schematic set up of a calibration system in accordance with an exemplary embodiment.

FIG. 1 shows a schematic set up of a calibration system, provided with the general reference sign 10, in accordance with an exemplary embodiment. The calibration system 10 comprises an optical arrangement 12 comprising a projector 14 and a camera 16.

The projector 14 is designed to project a first pattern onto a projection area 24, which is arranged in a measurement volume 18. As shown in FIG. 1, the projection area 24 is embodied as a matte surface on a display 22 of an electronic device, for example a cellular telephone or computer.

The camera 16 is designed to detect a second pattern displayed on a display area 26 of a display element. As shown in an exemplary manner in FIG. 1, the display element is the display 22, wherein the display area 26 is arranged on the same side of the display 22 as the matte projection area 24, to be precise in such a way that the display area 26 is aligned towards the camera 16. Preferably, the display area 26 is a display surface of the display 22.

Figure 2:
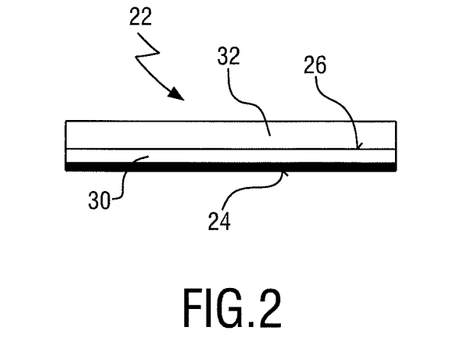
FIG. 2 shows a schematic cross-sectional view of a display for the calibration system in FIG. 1.

The camera 16 further comprises a detection plane 28 (FIG. 5), which is described in more detail in FIG. 2. The displayed second pattern from the display area 26 is imaged on the detection plane 28 of the camera 16 such that a camera image of the second pattern arises on the detection plane 28.

The display 22 is preferably positioned on a measuring table 20 displaceably situated in the measurement volume 18. As shown in an exemplary manner in FIG. 1, the display 22 is displaceable along a z-axis, which is directed perpendicular to the projection area 24 or the display area 26, the position of the display 22 preferably being directly readable using the measuring table. Hence, the displacement of the display 22 may be ascertained in a simple manner by reading the original position before the displacement and the new position after the displacement. Hence, by displacing the display 22, the display 22 may be positioned in a plurality of positions along the z-axis for the purposes of calibrating the optical arrangement. In order to calibrate the optical arrangement 12 with respect to the z-axis, a corresponding z-coordinate may be determined at each of these positions for a pattern point in the projected pattern of the first pattern or for an image point in the displayed second pattern.

The projection area 24 or the display area 26 is situated substantially in a plane spanned by an x-axis and a y-axis (xy-plane), as shown in FIG. 1 in an exemplary manner. Hence, the second pattern displayed on the display area 26, preferably on the display surface of the display 22, is situated substantially in the xy-plane. The camera image is produced by detecting the second pattern in order to calibrate the optical arrangement with respect to the x- and/or y-axis in the coordinate system of the measurement volume 18.

The second pattern is separate from the projected pattern of the first pattern. This means that the projected pattern and the second pattern are two separate patterns. The projected pattern arises from projecting the first pattern, while the second pattern is displayed directly on the display area 26 without projection. The second pattern may contain the same pattern form as the projected pattern or the first pattern and hence have the same content as the projected or first pattern.

The camera 16 may be designed to detect the projected pattern of the first pattern. Moreover, the matte surface may have a planarity error which is less than a planarity error of the optical arrangement 12 or of the projector 14.

FIG. 2 shows the display 22 of FIG. 1 in a schematic cross-sectional view. The display 22 comprises the matte surface as a projection area 24, which is arranged on a front side of a cover glass 30 facing the camera 16. A display surface is arranged as a display area 26 on a rear side of the cover glass 30 lying opposite the front side and away from the camera 16, the second pattern being able to be displayed on said display area by means of control electronics (not shown in any more detail) which are situated in the housing 32 of the display 22. It is understood that the display 22 in FIG. 2 is not shown true to scale, with the matte surface being depicted for reasons of clarity by means of a black line with a thickness drawn in an exaggerated manner. In particular, the projection area 24 and the display area 26 are illustrated as substantially one area in FIG. 1 since the space therebetween, i.e. the thickness of the cover glass 30, is so small as to be negligible in relation to other dimensions of the calibration system 10, for example in relation to the distance between the optical arrangement 12 and the display 22.

The matte surface may be formed by etching the cover glass 30. Alternatively, a matte film may be applied to a smooth cover glass 30 or the smooth cover glass 30 may be removed and replaced by a cover glass which is matte on one side. The display 22 may comprise a high resolution self-luminous display which is able to display computer-generated images/patterns, in particular sinusoidal patterns or stripe patterns.

The cover glass 30 may be designed to be switchable between a first state, in which the cover glass 30 is transparent, and a second state, in which the cover glass 30 is opaque. In particular, switching the cover glass 30 may be based on the use of an electrochromic layer or of a liquid crystal.

Figure 3:
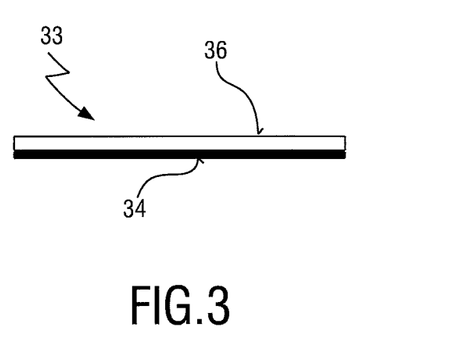
FIG. 3 shows a schematic cross-sectional view of a ground glass screen for the calibration system in FIG. 1.

In a schematic cross-sectional view, FIG. 3 shows a ground glass screen 33 as an alternative to the display 22 of the calibration system 10 shown in FIG. 1. The ground glass screen 33 comprises a matte surface as a projection area 34. A display area 36 for displaying a pattern is arranged on the rear side of the matte surface. Here too, the projection area 34 and the display area 36 are not depicted true to scale for reasons of clarity.

Figure 4:
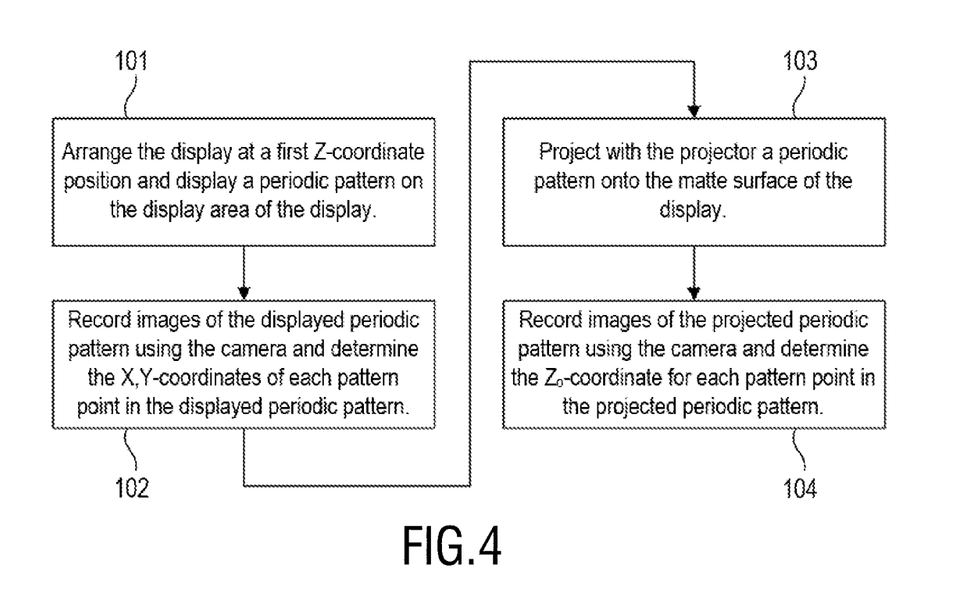
FIG. 4 shows a schematic block diagram of a calibration method in accordance with an exemplary embodiment.

FIG. 4 shows a schematic block diagram of a calibration method for calibrating the optical arrangement 12 shown in FIG. 1. Before the calibration, the display 22 is introduced into the measurement volume 18 at a first position, in which the display area 26 and the projection area 24 have a z-coordinate.

At the first position or at the z-coordinate of the display area 26, a (second) pattern, which is preferably a sinusoidal stripe pattern, is displayed on the display area 26, preferably the display surface, of the display 22 in a first step 101, to be precise in such a way that the displayed pattern may be detected by the camera 16. In a second step 102, the optical arrangement 12 is calibrated with respect to the x-axis and y-axis from the detected camera image of the second pattern by virtue of the sinusoidal stripe pattern being pushed through in the plurality of phase steps on the display area 26 of the display 22, both in the direction of the x-axis and of the y-axis.

To this end, the coordinates in the coordinate system of the detection plane, x' and y', are determined for each image point (pixel) in the camera image of the displayed (second) pattern. Moreover, the coordinates in the coordinate system of the measurement volume, x and y, are determined for the pattern point, corresponding to the considered image point, of the (second) pattern displayed on the display area. Correlating the coordinate pairs (x', y') and (x, y) with respect to one another yields the calibration of the optical arrangement with respect to the x-axis and y-axis of the measurement volume.

In the case of a perfect camera 16, straight stripes of the second pattern on the display 22 would be reproduced as straight stripes in the camera image of the second pattern. If the display 22 is inclined in relation to the optical axis 17 of the camera 16, there is a perspective distortion, in which straight stripes in the displayed pattern remain straight after imaging in the camera image. However, in the case of stripes with a slight curvature, such a distortion leads to a strong curvature of the stripes appearing in the camera image.

Figure 5:
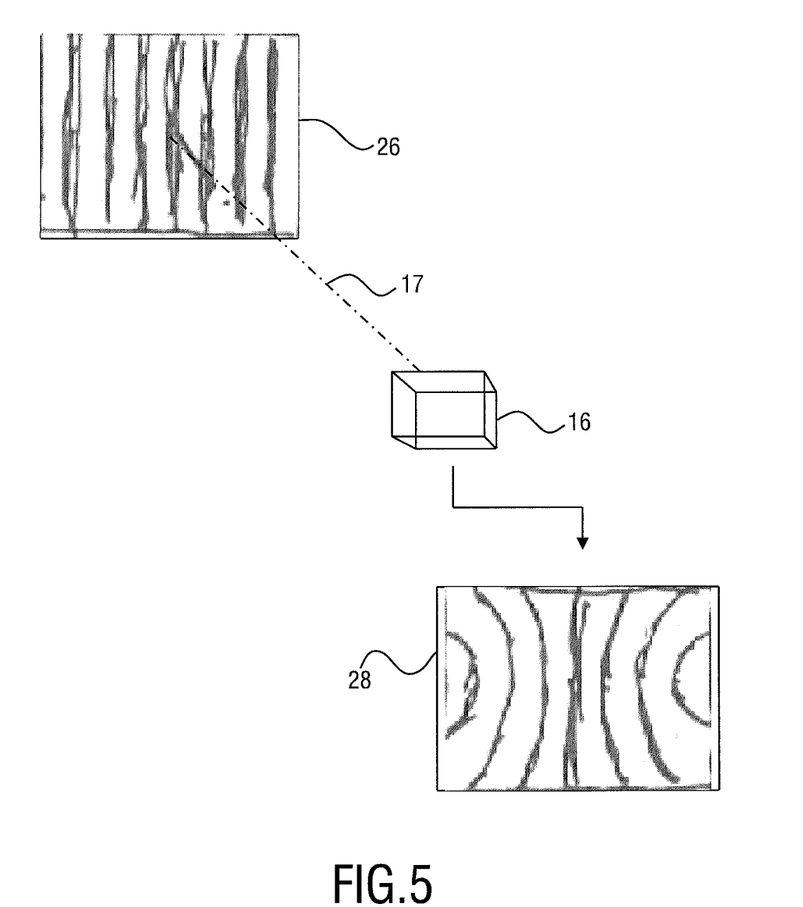
FIG. 5 shows an illustrative depiction of a distortion measurement by means of the calibration system in FIG. 1.

Such distortions may be evaluated very precisely for each individual image point (pixel) of the camera image with the aid of a phase evaluation. FIG. 5 shows an illustrative depiction for explaining an exemplary distortion measurement. By means of camera 16, a stripe pattern displayed on the display area 26 of the display 22 is imaged onto the detection plane 28 of the camera 16 in order to produce a camera image of the stripe pattern. As shown in FIG. 5, strongly curved stripes, which may result from distortion aberrations, are visible at the left and right edge of the camera image. In the case of displays produced by means of lithographic methods, the assumption may be made that the pixel grid of the display represents a virtually perfect pattern. Using an active display, it is possible, for example as described in more detail in Schmalz et al., Optical Engineering 50 (11), 113601 (Nov. 2011), to measure the distortions accurately in combination with a phase evaluation. Accordingly, this publication is incorporated by reference.

After calibrating the optical arrangement 12 with respect to the x-axis and y-axis (second axis), it is now possible to carry out the calibration with respect to the z-axis. To this end, the display 22 is preferably initially switched off. As shown in FIG. 4, a (first) pattern, preferably a sinusoidal stripe pattern, is then projected with the projector 14 onto the matte surface of the display 22 serving as a projection area 24 in a plurality of phase steps within a third step 103. From this, a projected pattern arises, for each pattern point of which a coordinate $z_0$ with respect to the z-axis is determined in the coordinate system of the measuring volume 18 in a fourth step 104 and a phase associated with the coordinate $z_0$ is ascertained. The coordinate $z_0$ may be determined by reading the position of the display 22 using the measuring table 20.

Hence, the associated x-coordinate and y-coordinate in the coordinate system of the measurement volume 18 and the phase associated with the coordinate $z_0$ may be determined for each pixel of the detection plane 28 of the camera 16. In this manner, a first calibration cycle is carried out for the first position of the display 22 corresponding to the coordinate $z_0$, the optical arrangement 12 being calibrated with respect to the x-axis, y-axis and z-axis of the measurement volume 18 during said calibration cycle.

Figure 6:
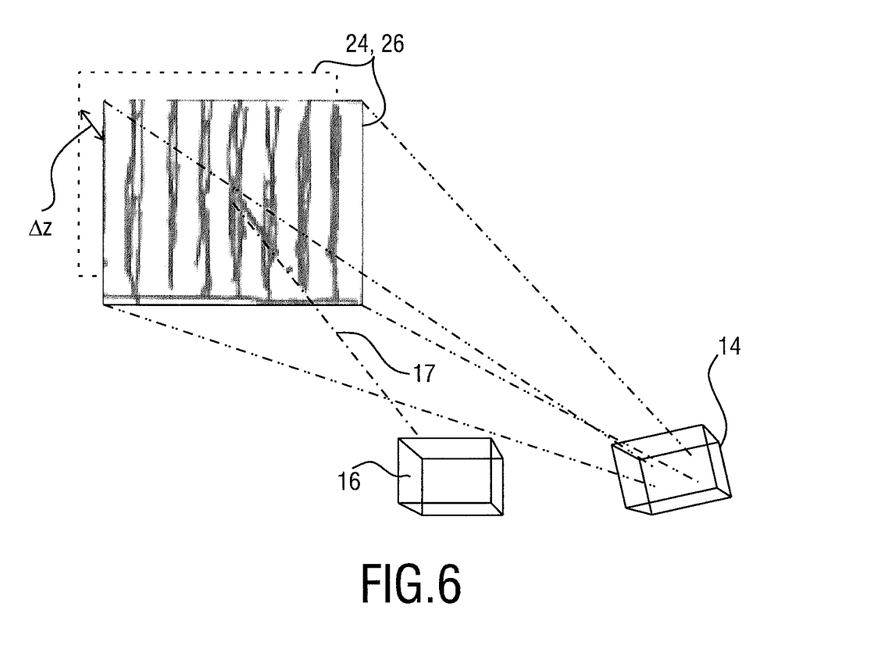
FIG. 6 shows an illustrative depiction of a calibration with respect to a z-axis by means of the calibration system in FIG. 1.

After the first calibration cycle, the display 22 is displaced to a new position along the z-axis for a next calibration cycle. Here, the pattern point of the pattern projected onto the projection area 24 is displaced with respect to the z-axis by a difference $\Delta z$, i.e. by $z_0 + \Delta z$, as shown in an exemplary manner in FIG. 6.

Steps 101 to 104 are carried out, like in the first calibration cycle, at the new position of the display 22. For a plurality of calibration cycles at the z-coordinates $z_0 + 2\Delta z$, $z_0 + 3\Delta z$, $z_0 + 4\Delta z$, ..., a phase emerges from the sinusoidal stripe pattern for each one of the selected z-coordinates in the coordinate system of the measurement volume 18. From this, it is possible to ascertain a phase dependence of the z-coordinate for each pattern point of the (first) pattern projected onto the projection area 24. In this way, a phase dependence of the z-coordinates for the pattern points of the (second) pattern displayed on the display area 26 is also determined at the same time.

The calibration of the optical arrangement 12 with respect to the x-axis and y-axis may be further optimized by the phase dependence of the z-coordinate ascertained during the calibration with respect to the z-axis. There may be a complete calibration of the optical arrangement 12 after the aforementioned plurality of calibration cycles. By way of example, the method described in H. Liu et al., Optics Communications 216 (2003) 65-80 may be used to this end. Accordingly, this publication is incorporated by reference.

Advantageously, the display 22 may be used both as a "passive" element (i.e. the display 22 does not display a pattern on the basis of an electronic graphics controller) for the calibration with respect to the z-axis in an illuminated state (preferably illuminated by the projector 14) and as an "active" element (i.e. the display 22 displays a pattern on the basis of the electronic graphics controller) for the calibration with respect to the x-axis and y-axis. As a result of this, various series methods for calibrating the optical arrangement, in particular for calibrating a stripe projection system and/or a different pattern-based projection system, may be carried out in an automated sequence using only one calibration area (projection area 24 and display area 26 of the display 22, as shown in FIG. 1).

Instead of the display 22, the ground glass screen 33 from FIG. 3 may be used in the calibration method shown in FIG. 4. To this end, a sinusoidal stripe pattern may be applied to the display area 36 on the rear side of the matte projection area 34, wherein the display area 36 may be illuminated during the calibration with respect to the x-axis and y-axis. The ground glass disk may be moved or displaced laterally for the purposes of producing a phase shift.

A computer program product in conjunction with the calibration system 10 of FIG. 1 may be used to carry out the calibration method shown in FIG. 4. The computer program product comprises a storage medium and computer instructions to be run in a processing unit for a calibration system 10, said computer instructions being stored in the storage medium, wherein the computer instructions, when run in the processing unit, provide the calibration method.

Figure 7:
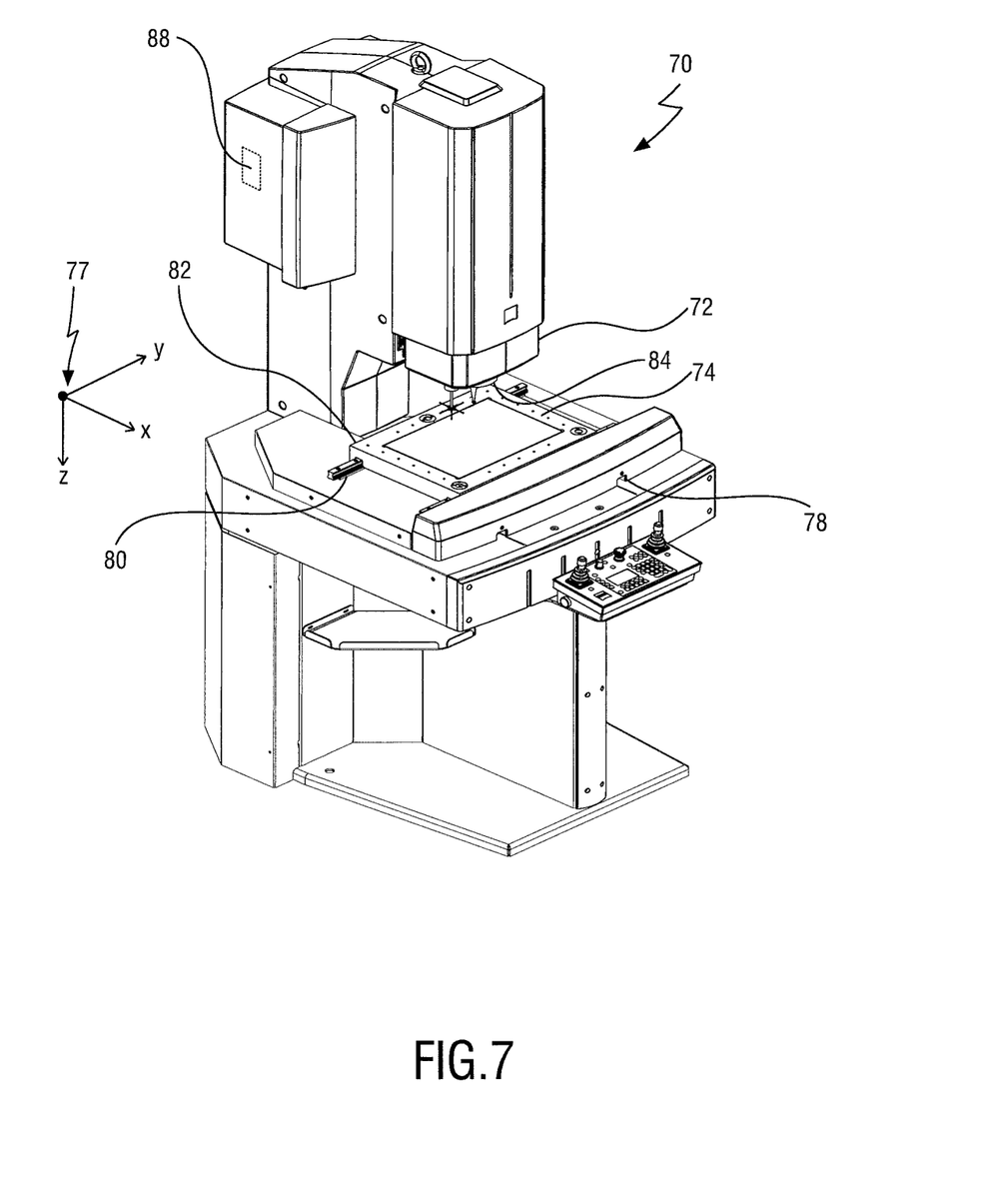
FIG. 7 shows a schematic perspective illustration of a coordinate measuring machine comprising a calibration system in accordance with an exemplary embodiment.

FIG. 7 shows an exemplary embodiment of the present invention in the context of a coordinate measuring machine 70 in a schematic perspective view. The coordinate measuring machine 70 is here selected as an example of a plurality of suitable apparatuses which are not limited to coordinate measuring machines within a narrow meaning of the term, such as those having a portal or column construction. In addition, the novel method and the corresponding apparatus are also advantageously suitable for the processing of objects.

Moreover, the novel method and the corresponding apparatus are not restricted to systems having serial kinematics. By way of example, the working head, which is movable relative to an object, could be arranged on a parallel kinematics construction or on a multiaxial robot arm. It is likewise possible for the working head to be stationary by itself, while the object may be positioned relative to the working head by way of a suitable kinematic construction including one or more robots.

The coordinate measuring machine 70 has a working head 72, which in the present case is arranged, at a pillar, above a workpiece table 74. The workpiece table 74 is embodied for receiving an object (not depicted here), which is to be measured using the working head 72. Typically coordinate-measuring machines are used to determine dimensional properties of objects, in particular as part of quality assurance and/or prototyping.

By way of example, the workpiece table 74 is what is known as a cross table, which may be displaced along two mutually orthogonal spatial directions by means of suitable drives 76 (not visible here). The two spatial directions are frequently referred to as x-axis and y-axis, and they define together with a third orthogonal axis (z-axis) a machine coordinate system, which is illustrated here with the reference sign 77. The workpiece table 74 here has linear guides 78, which permit linear movement along the coordinate axes.

Typically arranged in the region of at least one of the guides 78 in each coordinate direction is a linear scale 80, which together with a read head (not illustrated separately here) forms an encoder arrangement 82. The encoder arrangement 82 provides in a manner known per se first position information which represents—at least after corresponding evaluation—a respective working position of the working head 72 and of the workpiece table 74 in absolute coordinates of the coordinate system 77. In simplified fashion, only the encoder arrangement along the y-axis is designated in FIG. 1. However, the coordinate measuring machine 70 advantageously has a multidimensional encoder arrangement which provides absolute position information along the three coordinate axes. Accordingly, the working head 72 is displaceable on a guide along the z-axis (not illustrated here) via a drive system which is integrated in the pillar.

Arranged on the working head 72 is an optical sensor having a preferably integrated image sensor 84. The image sensor 84 serves to record an image of an object positioned on the workpiece table 74. Preferably, the image sensor 84 is configured as a camera which is suitable for recording an image of a pattern projected onto a projection area displaceably fixed on the workpiece table 74. To this end, a projector may be integrated in the coordinate measuring machine 70. Alternatively, use may be made of an external projector.

For the purposes of applying the present invention, a display (not shown here) and/or a ground glass screen (see FIGS. 1-2) may be arranged on the workpiece table 74 in a manner displaceable along the coordinate axes of the coordinate system 77, in a manner analogous to the optical arrangement 12 shown in FIG. 1 together with the stage 24. Hence, the coordinate measuring machine 70 may be calibrated according to the calibration method explained above, in particular according to the method described in conjunction with FIG. 4.

An evaluation and control unit 88 may be used to control movements of the working head 72 relative to the workpiece table 74 and to determine the respective working position of the working head 72 in the machine coordinate system 77. Moreover, in some exemplary embodiments, the evaluation and control unit 88 is configured to determine spatial coordinates on an object to be measured, wherein it uses the position information that is provided by the encoder arrangement 82 along the coordinate axes. Furthermore, for the purposes of determining the spatial coordinates, the evaluation and control unit 88 uses information provided by the image sensor 84.

What is claimed is:

1. A method for calibrating an optical arrangement for determining dimensional properties of a measurement object, the optical arrangement comprising a projector configured for projecting a first periodic pattern onto a projection area within a measurement volume and a camera for recording images of the projection area, the method comprising the steps of:
   a) arranging a device having a matte surface in the measurement volume at a first position relative to the optical arrangement along a first axis,
   b) displaying a second periodic pattern created by the device, which is separate from the first periodic pattern, on the matte surface and shifting the second periodic pattern in a plurality of phase steps in at least one second direction which is perpendicular to the first axis, the at least one second direction defining at least one second axis,
   c) recording images of the second periodic pattern using the camera and determining at least one distortion aberration of the camera using the second periodic pattern,
   d) projecting the first periodic pattern onto the matte surface by means of the projector,
   e) recording images of the first pattern using the camera and determining a first coordinate of at least one pattern point of the projected first periodic pattern, the first coordinate is with respect to the first axis,
   f) determining a second coordinate of the at least one pattern point of the projected first periodic pattern, the second coordinate is with respect to the second axis,
   g) displacing the matte surface relative to the optical arrangement to a second position along the first axis and repeating steps b) to f) for a plurality of relative positions of the matte surface along the first axis, and
   h) calibrating the optical arrangement with respect to the first and second axes within the measurement volume based upon an analysis of said recorded images of the first and second periodic patterns.

2. The method of claim 1, wherein the matte surface is arranged on a display of an electronic device having display control electronics, and wherein the second periodic pattern is displayed using the display control electronics.

3. The method of claim 2, wherein the electronic device is switched off during steps d) to e).

4. The method of claim 2, wherein the electronic device is a tablet computer, a smartphone, or a mobile computing device.

5. The method of claim 2, wherein the electronic device has a cover glass and wherein the matte surface is arranged on the cover glass by etching the cover glass or by applying a matte film onto the cover glass.

6. The method of claim 1, wherein the matte surface is provided by way of a cover glass facing the camera and having a rear side, wherein the second periodic pattern is formed on the rear side.

7. The method of claim 6, wherein the cover glass is designed to be switchable between a first state, in which the cover glass is transparent, and a second state, in which the cover glass is opaque.

8. The method of claim 6, wherein the matte surface is provided by way of a ground glass screen having said second periodic pattern fixedly formed thereon.

9. The method of claim 1, wherein the second periodic pattern is shifted in the at least one second direction by moving the optical arrangement relative to the matte surface along the at least one second axis.

10. The method of claim 1, wherein the at least one second direction comprises two second directions which are each perpendicular to the first axis and perpendicular with respect to each other.

11. The method of claim 1, wherein the first periodic pattern and the second periodic pattern comprise the same pattern form.

12. The method of claim 1, wherein the plurality of relative positions are selected in such a way that a distance between adjacent relative positions is constant.

13. The method of claim 1, wherein at least one of the first periodic pattern and the second periodic pattern is a sinusoidal stripe pattern.

14. The method of claim 1, wherein the camera has a plurality of individual pixels, and wherein distortion aberrations are determined for each individual pixel.

15. The method of claim 1, wherein the camera has a plurality of pixels defining a camera coordinate system, and wherein the first and second coordinates are assigned to coordinates of the plurality of individual pixels.

16. In a coordinate measuring machine comprising a workpiece table configured for receiving a measurement object, comprising a working head moveable relative to the workpiece table along a first axis, the first axis being perpendicular to the workpiece table, and comprising an evaluation and control unit configured for determining spatial coordinates on the measurement object using the working head and the workpiece table, with the working head comprising an optical arrangement having a camera and a projector, and with the projector being configured for projecting a first periodic pattern onto a projection area on the workpiece table, a method for calibrating the optical arrangement comprising the steps of:

a) arranging a device having a matte surface on the workpiece table while the optical arrangement is at a first position relative to the workpiece table along the first axis, b) displaying a second periodic pattern created by the device, which is separate from the first periodic pattern, on the matte surface and shifting the second periodic pattern in a plurality of phase steps in at least one second direction which is perpendicular to the first axis, the at least one second direction defining at least one second axis, c) recording images of the second periodic pattern using the camera and determining at least one distortion aberration of the camera using the second periodic pattern, d) projecting the first periodic pattern onto the matte surface by means of the projector, e) recording images of the first pattern using the camera and determining a first coordinate of at least one pattern point of the projected first periodic pattern using the evaluation and control unit, the first coordinate is with respect to the first axis, f) determining a second coordinate of the at least one pattern point of the projected first periodic pattern using the evaluation and control unit, the second coordinate is with respect to the second axis, g) displacing the matte surface relative to the optical arrangement to a second relative position along the first axis and repeating steps b) to f) for a plurality of relative positions of the matte surface along the first axis and h) calibrating the optical arrangement with respect to the first and second axes based upon an analysis of said recorded images of the first and second periodic patterns.

17. The method of claim 16, wherein the matte surface is arranged on a display of an electronic device having display control electronics, and wherein the second periodic pattern is displayed using the display control electronics.

18. A coordinate measuring machine for determining dimensional properties of a measurement object, comprising:

a workpiece table, an optical arrangement moveable relative to the workpiece table, the optical arrangement comprising a projector configured for projecting a first periodic pattern onto a projection area within a measurement volume, and comprising a camera configured for recording images of the projection area, an evaluation and control unit configured for determining spatial coordinates on the measurement object using the first periodic pattern and the camera, and a calibration device for calibrating the optical arrangement, wherein the calibration device is arranged on the workpiece table at a first position relative to the optical arrangement along a first axis, and comprises a matte surface that is configured to display a second periodic pattern, which is separate from the first periodic pattern; and wherein the evaluation and control unit is further configured to execute the following steps:

i) shifting the second periodic pattern relative to the optical arrangement in a plurality of phase steps in at least one second direction which is perpendicular to the first axis, the at least one second direction defining at least one second axis, ii) recording images of the second periodic pattern using the camera and determining at least one distortion aberration of the camera using the second periodic pattern, iii) projecting the first periodic pattern onto the matte surface by means of the projector, iv) recording images of the first pattern using the camera and determining a first coordinate of at least one pattern point of the projected first periodic pattern, the first coordinate is with respect to the first axis, v) determining a second coordinate of the at least one pattern point of the projected first periodic pattern, the second coordinate is with respect to the second axis, vi) displacing the matte surface relative to the optical arrangement to a second relative position along the first axis and repeating steps i) to v) for a plurality of relative positions of the matte surface along the first axis and vii) calibrating the optical arrangement with respect to the first and second axes within the measurement volume based upon an analysis of said recorded images of the first and second periodic patterns.

19. The coordinate measuring machine of claim 18, wherein the matte surface is arranged on a display of an electronic device having display control electronics, and wherein the second periodic pattern is displayed using the display control electronics.

* * * * *